United States Patent
Wang et al.

(10) Patent No.: US 7,729,411 B2
(45) Date of Patent: Jun. 1, 2010

(54) JOINT DETECTOR IN A CODE DIVISION MULTIPLE ACCESS RADIO RECEIVER

(75) Inventors: Yi-Pin Eric Wang, Cary, NC (US); Jung-Fu Cheng, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1020 days.

(21) Appl. No.: 11/115,491

(22) Filed: Apr. 27, 2005

(65) Prior Publication Data

US 2006/0245476 A1    Nov. 2, 2006

(51) Int. Cl.
    *H04B 1/00* (2006.01)
(52) U.S. Cl. ............... 375/147; 375/136; 375/137; 375/144; 375/148; 375/325; 375/341; 375/349; 375/334; 375/347
(58) Field of Classification Search ............... 375/147, 375/136, 137, 144, 148, 325, 341, 349, 347; 370/334; 455/69, 63
    See application file for complete search history.

(56) References Cited

U.S. PATENT DOCUMENTS

| | | |
|---|---|---|
| 6,501,788 B1 | 12/2002 | Wang et al. |
| 6,574,270 B1 | 6/2003 | Madkour et al. |
| 2002/0054632 A1* | 5/2002 | Chuang et al. ............... 375/224 |
| 2002/0160721 A1* | 10/2002 | Kanemoto et al. ............ 455/69 |
| 2004/0146024 A1* | 7/2004 | Li et al. ....................... 370/334 |
| 2006/0018398 A1* | 1/2006 | Shamsunder ................ 375/267 |
| 2006/0056360 A1 | 3/2006 | Parkall et al. |

OTHER PUBLICATIONS

Qualcomm; "Impact of DL Channels on E-DPDCH"; 3GPP TSG RAN WG1 #33, Aug. 2003, New York, USA.
Sergio Verdu; "Multiuser Detection," Cambridge, UK, Cambridge University Press, 1998.

* cited by examiner

*Primary Examiner*—Shuwang Liu
*Assistant Examiner*—Kabir A Timory

(57) ABSTRACT

A joint detector that improves the performance of receiving a downlink control channel signal for a near-end mobile terminal in the presence of a stronger control channel signal addressed to a far-end mobile terminal sharing the same OVSF, or channelization, code through the use of orthogonal signature sequences. Depending on the specific embodiment, the joint detector may produce the desired bits for the control signal of interest, or may produce detected bits for all control signals sharing the same OVSF code. The joint detector despreads and combines the received code-multiplexed signal, utilizing knowledge of the cross correlations of the set of signature sequences and time-varying channel coefficients to alleviate performance degradation caused by interference from other signals. In various embodiments, the joint detector may be implemented as a modified decorrelating detector, a modified MMSE detector, a modified LS estimator detector, a successive interference-canceling detector, or a jointly hypothesized detector.

5 Claims, 4 Drawing Sheets

JOINT DETECTOR IN A CODE DIVISION MULTIPLE ACCESS RADIO RECEIVER

BACKGROUND

The present invention relates to spread-spectrum, Code Division Multiple Access (CDMA) communication systems. More particularly, and not by way of limitation, the present invention is directed to a joint detector for receiving an Orthogonal Variable Spreading Factor (OVSF) code-sharing, low-rate, code-multiplexed channel. The OVSF code, often referred to as the channelization code or spreading code, is used to spread a lower data rate signal to the transmission baud (chip) rate, which may be 3.84 mega-baud (or chip) per second according to the Wideband CDMA (WCDMA) standard, or 1.2288 mega-baud (or chip) per second according to the IS-95 and cdma2000 standards.

In WCDMA, an enhancement known as Enhanced Uplink is contemplated for reducing delays, improving uplink high-data-rate coverage, and increasing capacity. A key enabler for meeting these objectives is Hybrid Automatic Repeat Request (HARQ) with fast retransmission and soft combining. To support uplink HARQ operations, Enhanced HARQ Indication Channels (E-HICHs) are needed in the downlink for the base station to signal Ack or Nack messages. HARQ is of critical importance in reducing round-trip delays and improving uplink high-data-rate coverage and capacity. Therefore it is highly desirable to have reliable E-HICH reception.

In order to avoid scheduling delay, the current concept of Enhanced Uplink allows a mobile terminal to transmit in the uplink direction without a scheduling grant as long as the transmission data rate is not exceedingly high. As a result, many mobile terminals may simultaneously transmit in the uplink direction using the HARQ protocol. In response, the base station must provide many E-HICHs in a transmission time interval (TTI). To avoid having E-HICHs consume too many OVSF codes, an OVSF-code sharing, code-division multiplexed (CDM) architecture has been introduced for E-HICHs. According to this CDM approach, a number of E-HICHs share a common OVSF (channelization) code. A 1-bit Ack/Nack message of each E-HICH is modulated (spread) by a user-specific signature sequence before OVSF spreading. With this approach, the signals transmitted on the code-sharing E-HICH are mutually orthogonal through the use of mutually orthogonal Hadamard sequences as the signature sequences. According to the CDM architecture, the duration of the signature sequence is one slot. For clarity in the following description, the term "OVSF code" or "channelization code" means the spreading sequence that spreads an input signal to the WCDMA chip rate (3.84 Mcps), and the term "signature sequence" means the spreading sequence applied to the 1-bit Ack/Nack information.

FIG. 1 is a simplified block diagram illustrating the generation of E-HICHs according to the preexisting CDM architecture. As shown, E-HICHs for users 1-K share a common OVSF (channelization) code channel. Prior to the normal OVSF spreading at 11, signature sequences are employed at $12_1$ through $12_K$ to separate the E-HICHs sharing the same OVSF code. According to the CDM architecture in WCDMA, the common OVSF code has a spreading factor of 128, giving rise to 20 symbols in a slot. The signature sequence is thus based on length-40 Hadamard sequences and QPSK modulation mapping every two bits of the Hadamard sequence to one QPSK symbol. In this case, the different transmitted CDM E-HICHs are mutually orthogonal when the signal is integrated over a slot.

At the receiver, the orthogonality also holds if the fading channel is non-dispersive and constant within a slot. With multipath, the orthogonality remains high as long as the channel is constant within a slot due to the large processing gain (2560) against the inter-chip interference. Orthogonality, however, is very much compromised in high Doppler channels in which multipath fading varies noticeably in the slot interval. Conventionally, the received signal is first RAKE processed (i.e., despread and combined using the common OVSF code), and the RAKE receiver output is correlated with the Hadamard sequence associated with the E-HICH of interest. In a time-varying channel, the orthogonality between the various E-HICHs sharing the same OVSF code cannot be preserved when simply correlating with the signature sequence of interest. Loss of orthogonality results in co-channel interference.

FIG. 2 is a simplified block diagram illustrating the transmission of E-HICHs to two mobile terminals 15 and 16 in a near-far scenario. Loss of orthogonality may result in severe performance degradation when the base station 17 uses a relatively weak transmit power to transmit a signal 18 to the near-end mobile terminal 15 and a much stronger transmit power to transmit a signal 19 to the far-end mobile terminal 16. In this case, the E-HICH signal intended for the far-end mobile terminal can cause significant interference at the near-end mobile terminal's receiver, resulting in significant degradation to the near-end mobile terminal's E-HICH performance.

SUMMARY

The present invention is directed to a joint detector that improves the performance of receiving, for example, a downlink E-HICH control signal for a near-end mobile terminal in the presence of a stronger E-HICH control signal addressed to a far-end mobile terminal sharing the same OVSF, or channelization, code through the use of orthogonal signature sequences. Depending on the specific embodiment, the joint detector may produce the desired bits for the control signal of interest, or may produce detected bits for all control signals sharing the same OVSF code. The joint detector despreads and combines the received code-multiplexed signal, utilizing knowledge of the cross correlations of the set of signature sequences and time-varying channel coefficients to alleviate performance degradation caused by interference from other signals. In various embodiments, the joint detector may be implemented as a modified decorrelating detector, a modified MMSE detector, a modified LS estimator detector, a successive interference-canceling detector, or a jointly hypothesized detector. A mobile terminal equipped with the joint detector may continuously use the detector to receive E-HICH information, or may use the detector only when the mobile terminal is receiving on a high Doppler channel and/or there are high-power CDM signals present.

Thus, in one aspect, the present invention is directed to a joint detector in a spread spectrum CDMA receiver that receives a code-multiplexed signal in a time-varying channel, reduces cross-interference between a plurality of OVSF code sharing control signals, and estimates a symbol of interest. The joint detector includes means for despreading and combining the received code-multiplexed signal; means for generating decision statistics for detecting each of the plurality of OVSF code sharing control signals; means for reducing cross-interference between the OVSF code sharing control signals based on both code information and time-varying channel information; and means for estimating the symbol of interest from the OVSF code sharing control signals, each of which has reduced interference.

In another aspect, the present invention is directed to a method of jointly detecting a symbol of interest utilizing successive interference cancellation. The method recovers a symbol of interest transmitted in a communications medium according to a user-specific signature sequence from a set of signature sequences utilized to transmit symbols in the system. The method includes the steps of receiving a communications signal from the communications medium; RAKE processing the received communications signal to resolve the signal into a plurality of combined signal components, a respective one of which is associated with the symbol of interest; correlating the resolved plurality of signal components with the set of signature sequences to generate a respective set of correlations; and determining which correlation from the signature sequences carries the most energy. Thereafter, the method detects a transmitted symbol associated with the correlation determined to carry the most energy, and determines whether the detected symbol is the symbol of interest. If the detected symbol is not the symbol of interest, the method removes from the signal components output by the RAKE processing, a contribution associated with the correlation determined to carry the most energy. The above steps of correlating components and sequences, energy determining, removing contributions with the most energy, and symbol detecting are repeated until the detected symbol is the symbol of interest. The method then estimates the value of the symbol of interest.

In yet another aspect, the present invention is directed to a method of jointly detecting a symbol of interest utilizing a jointly hypothesized detector. The method includes the steps of receiving a communications signal from the communications medium; RAKE processing the received communications signal to resolve the signal into a plurality of combined signal components; and determining a set of $K_d$ symbols having the strongest energy. One of these symbols is the symbol of interest. The method then determines a hypothesized received signal for the $K_d$-tuple hypothesis, and calculates an error metric based on the difference between the hypothesized received signal and the actual received signal. The method continues to determine error metrics until error metrics have been calculated for all of the hypotheses. At that point, the hypothesis with the smallest error metric is selected as being the detected symbols, one of which is associated with the symbol of interest.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

Figure 1:
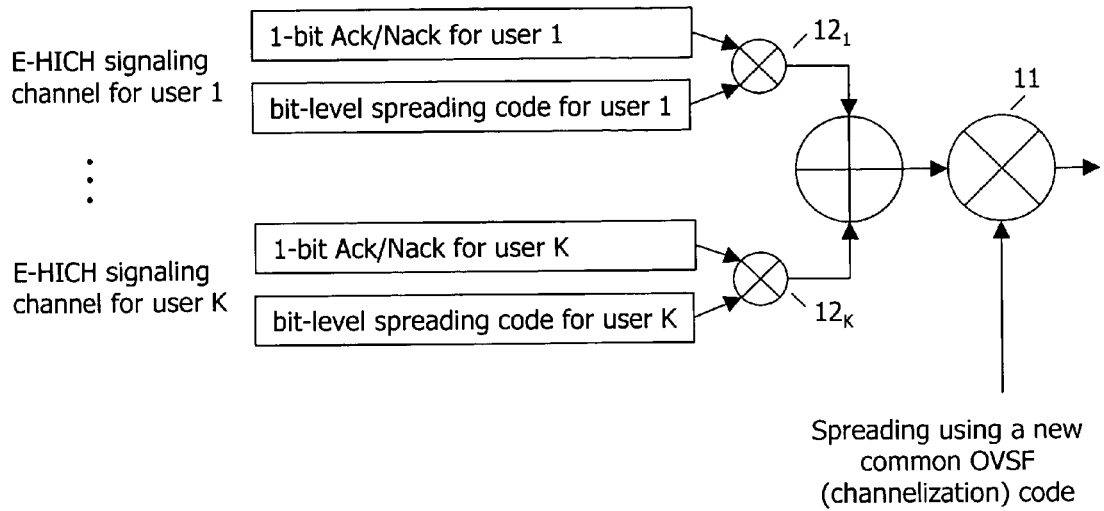
FIG. 1 (Prior Art) is a simplified block diagram illustrating the generation of E-HICHs according to the CDM architecture.
Figure 2:
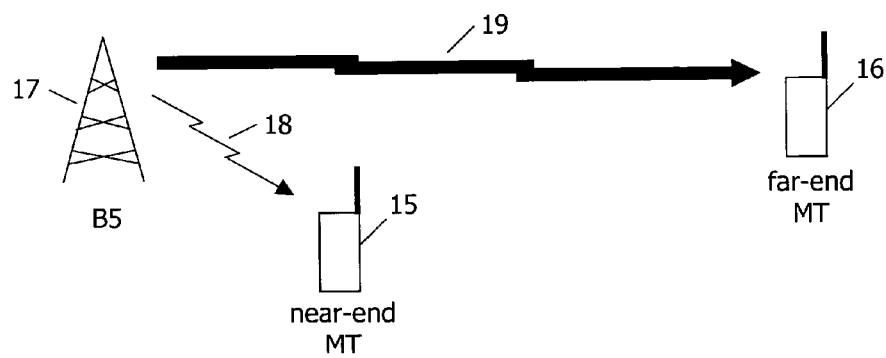
FIG. 2 (Prior Art) is a simplified block diagram illustrating the transmission of E-HICHs to two mobile terminals in a near-far scenario.

The present invention is directed to a joint detector that improves the performance of E-HICH reception for a near-end mobile terminal in the presence of a stronger E-HICH signal addressed to a far-end mobile terminal. The joint detector is utilized in a receiver apparatus after a RAKE receiver resolves a plurality of signal components by despreading and combining the received signal using a common OVSF code, and a correlator correlates the signal components with a set of signature sequences to generate a respective set of correlations. A mobile terminal equipped with the joint detector may continuously use the detector to receive E-HICH information, or may use the detector only when the mobile terminal is receiving on a high Doppler channel and/or there are high-power CDM signals present.

In the description herein, five embodiments of the joint detector are disclosed: (1) a decorrelating detector, (2) a minimum mean squares estimator (MMSE) detector, (3) a least squares (LS) detector, (4) a successive interference canceling detector, and (5) a jointly hypothesized detector. Embodiments 1-3 and 5 are "one-shot" processes, while embodiment 4, the successive interference-canceling detector, is an iterative process.

Modified Decorrelating Detector

A decorrelating detector using only a code matrix is a well-known near-far resistant receiver. In the description below, it is shown how this receiver is modified to improve the performance of E-HICH reception in a time-varying channel.

Let $E_s(k)$ be the symbol energy for the kth E-HICH. The RAKE receiver output during the ith symbol period is:

$$z(i) = \sum_{k=0}^{K-1} \sqrt{E_s(k)}\, c_k(i)|h(i)|^2 s(k) + n(i) \qquad (1)$$

where:
s(k) represents kth user's Ack/Nack bit;
$c_k(i)$ is the ith symbol of the signature sequence assigned to user k's E-HICH; and
K is the number of code-multiplexed E-HICHs.

Note that if some of the E-HICHs are discontinuously transmitted (i.e., DTX'd), the symbol energy can be set to 0 in (1).

If we let $z=(z(0), z(1), \ldots, z(N-1))^T$, where N is the length of the signature sequence, vector z can be represented as:

$$z = HCAs + n, \qquad (2)$$

where:
H is a diagonal matrix with the jth diagonal element equal to $|h(j)|^2$;
C is a matrix with the jth column equal to the jth signature sequence $c_j = (c_j(0), c_j(1), \ldots, c_j(N-1))^T$;
A is a diagonal matrix having $\sqrt{E_s(k)}$ as the kth diagonal element;
s is a vector with the kth element as s(k); and
$n = (n(0), n(1), \ldots, n(N-1))^T$.

Then, $C^H z$ gives decision statistics needed for E-HICH detection:

$$q = C^H z \qquad (3)$$
$$= RAs + n',$$

where $R=C^H HC$, and $n'=C^H n$. Note that for the jth E-HICH, the jth component of q is the decision statistic used by the conventional detector.

A decorrelating receiver for equation (3) can be formulated as:

$$u = R^{-1} q \quad (4)$$
$$= As + n'',$$

where $n''=R^{-1}n'$. Since A is diagonal, it follows that the kth element of u is only contributed by symbol s(k).

Thus, the decorrelating detector for user j is of the form:

$$u(j) = ((C^H HC)^{-1} C^H)_j z, \quad (5)$$

where subscript $_j$ represents the jth row of matrix $((C^H HC)^{-1} C^H)$. Note that the modified decorrelating detector of the present invention differs from those in the prior art in that the detector of the present invention includes an element H, which is a function of the time-varying fading channel.

Modified MMSE Detector

An MMSE receiver can also be modified and utilized to improve the performance of E-HICH reception in a time-varying channel. In fact, if the impairment is a mix of multi-user interference and additive white Gaussian noise (AWGN), the modified MMSE detector achieves better performance than the modified decorrelating detector described above. It can be shown that the MMSE receiver for processing q in equation (3) is:

$$u = (C^H HC + \sigma^2 A^{-2})^{-1} q \quad (6)$$
$$= (C^H HC + \sigma^2 A^{-2})^{-1} C^H z,$$

where $\sigma^2$ is the variance of the impairment component at a despreader output. Thus, to detect s(j), $$u(j) = ((C^H HC + \sigma^2 A^{-2})^{-1} C^H)_j z. \quad (7)$$

From equation (7), it can be seen that the MMSE detector must estimate the noise variance, $\sigma^2$, and also the amplitudes, A, of the code-sharing E-HICHs. Additionally, to make sure the factor A is invertible, in this case only the active E-HICHs are considered. Similar to the modified decorrelating detector, the modified MMSE detector of the present invention differs from those in the prior art in that the detector of the present invention includes an element H, which is a function of the time-varying fading channel.

Modified Lease-Squares (LS) Estimator

Equation (2) may be rewritten as:

$$z = HCs' + n, \quad (8)$$

where $s'=(\sqrt{E_s(0)}s(0), \sqrt{E_s(1)}s(1), \ldots, \sqrt{E_s(K-1)}s(K-1))^T$. Then, the least-squares (LS) estimator of s' can be obtained by:

$$u_{LS} = (C^H HHC)^{-1} C^H Hz. \quad (9)$$

Thus, the LS estimator for user j is of the form:

$$u(j) = ((C^H HHC)^{-1} C^H H)_j z. \quad (10)$$

Again, as seen, the modified LS estimator of the present invention differs from those in the prior art in that the detector of the present invention includes an element H, which is a function of the time-varying fading channel.

Modified Successive Interference-Canceling Detector

Successive interference cancellation is also widely used to improve reception in the presence of multi-user interference. The modified cancellation method and apparatus of the present invention works well to improve the performance of E-HICH reception in a time-varying channel when the receiver does not have knowledge of spreading code assignments. The procedure described herein builds on procedures described in co-owned U.S. Pat. No. 6,501,788 and U.S. Pat. No. 6,574,270, both of which are hereby incorporated by reference in their entireties.

First, the receiver correlates the RAKE combined values with all the signature sequences, and detects which correlation carries the most energy. The transmitted symbol associated with this sequence is then detected. If the detected symbol is not the symbol of interest, the contribution from this sequence is removed from the RAKE output values. This creates a set of RAKE processed signal components, with each component having reduced interference. After that, the receiver correlates this modified set of RAKE combined values with all the signature sequences again, and detects which sequence carries the most energy. The contribution from this sequence to the RAKE output values is then removed. This correlation, symbol detection, and interference cancellation process repeats until correlation with the desired signature sequence (i.e., the sequence associated with the symbol of interest) becomes the largest. When this happens, the receiver estimates the transmitted symbol value.

Figure 3:
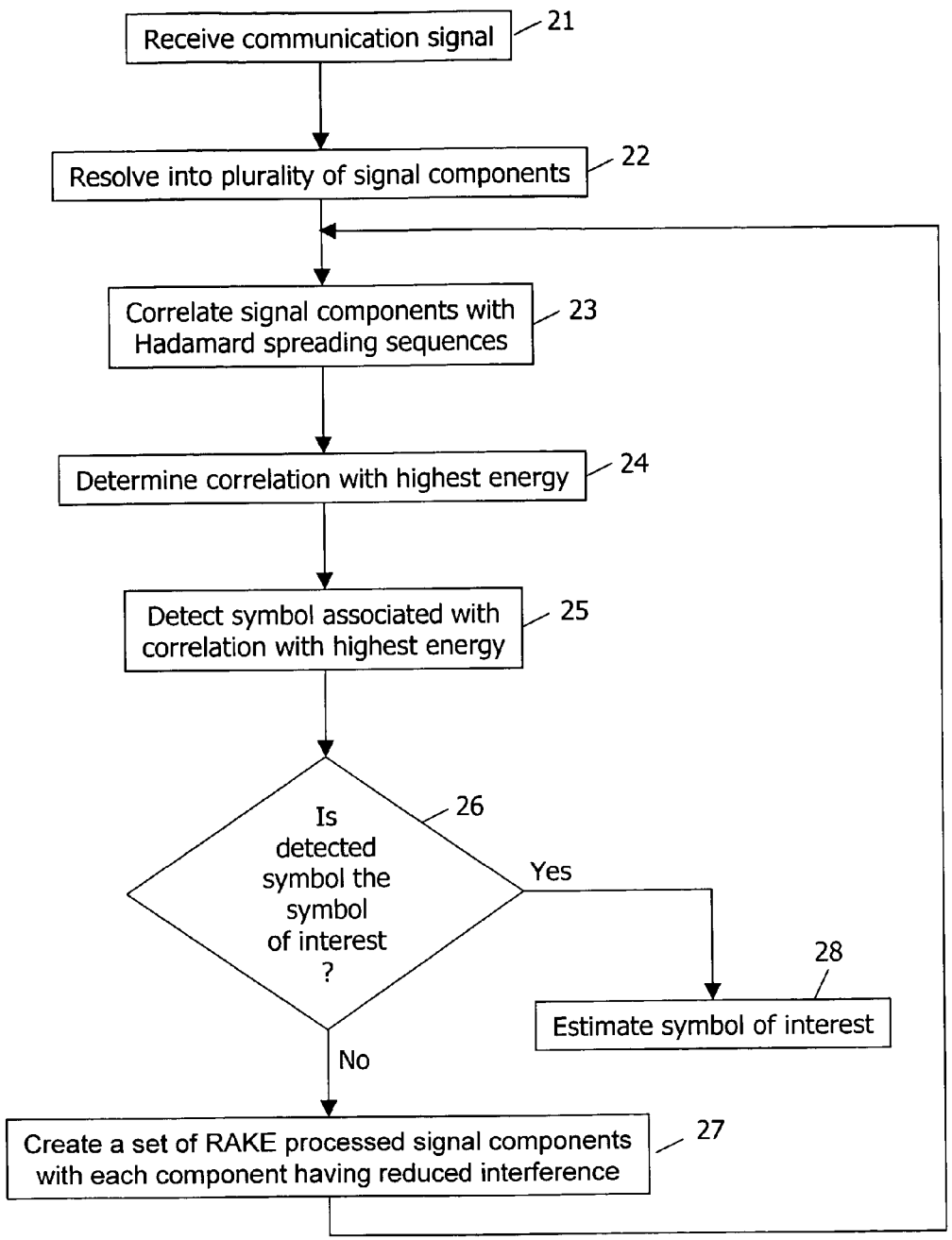
FIG. 3 is a flow diagram illustrating the steps performed by a successive interference-canceling detector in one embodiment of the present invention.

FIG. 3 is a flow diagram illustrating the iterative embodiment of the method of the present invention, i.e., the successive interference-canceling detector. At step 21, a communication signal is received. At step 22, the signal is resolved into a plurality of signal components by despreading and combining the signal in a RAKE receiver. At step 23, the resolved signal components are correlated with N possible signature spreading sequences. At step 24, a combiner determines which correlation has the highest energy level. At step 25, a symbol detector detects the symbol associated with the correlation having the highest energy.

At step 26, it is determined whether the detected symbol is the symbol of interest. If not, the process moves to step 27 where an interference cancellation process removes the contribution associated with the correlation having the highest energy from the signal components output from the RAKE processing. This creates a set of RAKE processed signal components, with each component having reduced interference. The process then returns to step 23 and repeats the steps of correlation, energy determination, symbol detection, and interference cancellation until correlation with the desired Hadamard sequence (i.e., the sequence associated with the symbol of interest) becomes the largest. The process then moves from step 26 to step 28 where a symbol estimator estimates the transmitted symbol value.

Jointly Hypothesized Detector

In this embodiment, maximum a posteriori probability criteria are utilized, and the detected symbols can be expressed as:

$$\hat{s} = \arg \max P(s/z). \quad (11)$$

That is, a value of $\hat{s}$ is found that maximizes the a posteriori probability $P(\hat{s}|z)$. Assuming all symbols are equally likely, the detected symbols can be obtained by minimizing the error metric:

$$\hat{s} = \arg\max M(\hat{s}), \quad (12)$$

where $$M(\hat{s}) = |z(\hat{s}) - z|^2, \quad (13)$$

where the ith element of $z(\hat{s})$ is:

$$z(\hat{s}, i) = \sum_{k=0}^{K-1} \sqrt{E_s(k)}\, c_k(i) |h(i)|^2 \hat{s}(k). \quad (14)$$

Note that similar to the modified MMSE detector described above, either the symbol energy ($E_s(k)$) or amplitude has to be estimated. In one embodiment, the metric M is calculated for all possible symbol hypotheses. This involves calculating $Q^M$ metrics, where Q is the constellation size of $s(k)$. In another embodiment, complexity is reduced by jointly hypothesizing the desired symbol with other $K_d-1$ symbols, which are detected to have the largest symbol energy. In this case, all the other symbols that are not jointly hypothesized are simply treated as noise. In this case, $z(\hat{s},i)$ can be modified to:

$$z(\hat{s}, i) = \sum_{k=0}^{K_d-1} \sqrt{E_s(k)}\, c_k(i) |h(i)|^2 \hat{s}(k). \quad (15)$$

Here we assume $s(0)$ is the desired symbol and symbols $s(1)$, $s(2)$, ..., $s(K_d-1)$ are the symbols with the strongest energy.

Figure 4:
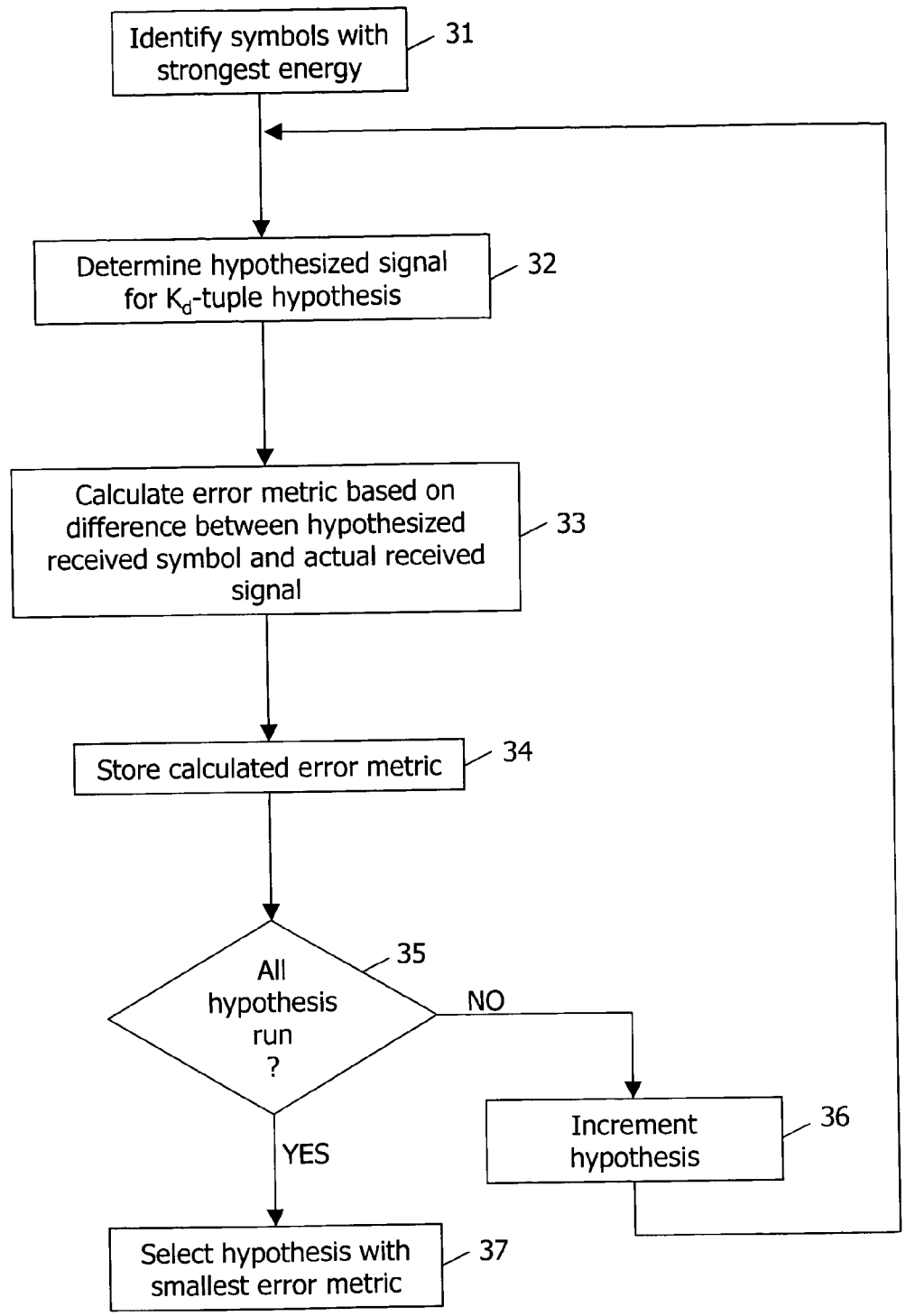
FIG. 4 is a flow diagram illustrating the steps performed by a jointly hypothesized detector in a further embodiment of the present invention.

FIG. 4 is a flow diagram illustrating the steps performed by the jointly hypothesized detector in one embodiment of the present invention. At step 31, the jointly hypothesized detector may first identify symbols with the strongest energy, denoted herein as $s(1)$, $s(2)$, ..., $s(K_d-1)$. Starting then with the $K_d$-tuple hypothesis ($\hat{s}(0)=1, \hat{s}(1)=1, ..., \hat{s}(K_d-1)=1$), the detector determines at step 32, the hypothesized received signal for the $K_d$-tuple hypothesis. In practice, this may be obtained, for example, by solving equation (15) above. At step 33, the detector then calculates an error metric based on the difference between the hypothesized received signal and the actual received signal. In practice, this may be obtained, for example, by solving equation (13) above. At step 34, the calculated error metric is stored. At step 35, it is determined whether or not all of the hypotheses have been run (i.e., whether the detector has determined hypothesized received signals and calculated error metrics for all of the hypotheses). If not, the process moves to step 36 where the detector increments the hypothesis, and then repeats steps 32-34. This repetitive process continues until the detector has determined hypothesized received signals and calculated error metrics, for all of the hypotheses. By way of example, if $s(k)$ is BPSK modulated, taking values from $\{1,-1\}$, the other hypotheses are:

$$(\hat{s}(0)=-1, \hat{s}(1)=1, ..., \hat{s}(K_d-1)=1)$$

$$(\hat{s}(0)=1, \hat{s}(1)=-1, ..., \hat{s}(K_d-1)=1)$$

$$(\hat{s}(0)=-1, \hat{s}(1)=-1, ..., \hat{s}(K_d-1)=1)$$

$$(\hat{s}(0)=-1, \hat{s}(1)=-1, ..., \hat{s}(K_d-1)=-1).$$

Overall, there are $2^{K_d}$ hypotheses, including the first one. When it is determined at step 35 that all of the hypotheses have been run, the process moves to step 37 where the detector selects the hypothesis with the smallest error metric. This gives $K_d$ detected symbols. The detected symbol for the symbol of interest is the first symbol among these $K_d$ detected symbols, i.e., $\hat{s}(0)$.

Figure 5:
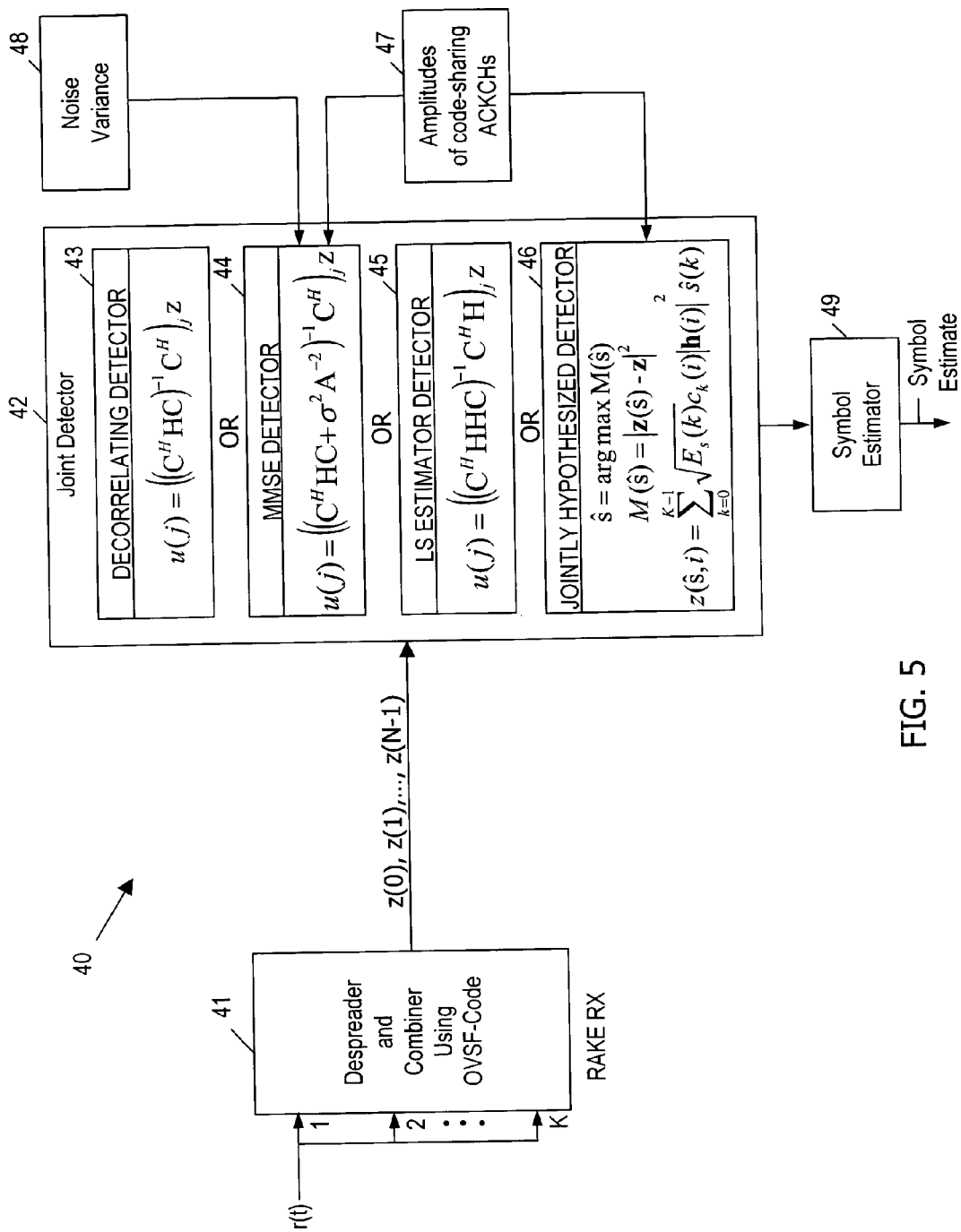
FIG. 5 is a simplified block diagram of a receiver apparatus, according to the present invention, for recovering a symbol of interest transmitted in a communications medium according to a first signature sequence of a set of signature spreading sequences.

FIG. 5 is a simplified block diagram of a receiver apparatus 40, according to the present invention, for recovering a symbol of interest transmitted in a communications medium according to a first E-HICH signature sequence of a set of E-HICH signature sequences. A received signal r(t) is first resolved into a plurality of signal components 1-K by despreading and combining the signal in a RAKE receiver 41 using the common channelization code. The output of the RAKE receiver is a series of N values, $z(0), z(1), ..., z(N-1)$, each one corresponding to the RAKE receiver output in one symbol (or bit) period. These z values are then input to a joint detector 42, which identifies one or more signature sequences (other than the desired signature sequence) that are associated with multi-user interference in the received signal r(t). For example, the joint detector may identify signature sequences that have the highest associated energies, i.e., choosing those sequences associated with the signals most like to contribute to multi-user interference.

Depending on the particular embodiment, the joint detector 32 may be implemented as a modified decorrelating detector 43, a modified MMSE detector 44, a modified LS estimator detector 45, or a jointly hypothesized detector 46. Note that the jointly hypothesized detector requires either the symbol energy or the amplitudes 47 of the code-sharing E-HICHs included in the received radio signal r(t). The modified MMSE detector requires both the amplitude information and an estimate of the noise variance 48. Once the desired sequence is identified, a symbol estimator 49 (e.g., decision device) determines an estimate of the symbol of interest.

It is additionally noted that according to WCDMA Release 6, the physical channel Enhanced Relative Grant Channel (E-RGCH) is similar to the E-HICH. Therefore, the present invention, and all of the embodiments described herein, can be applied to the E-RGCH as well as the E-HICH.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A joint detector in a spread spectrum code division multiple access (CDMA) receiver that receives a code-multiplexed signal in a time-varying channel, reduces cross-interference between a plurality of Orthogonal Variable Spreading Factor (OVSF) code sharing control signals, and estimates a symbol of interest, wherein the code-multiplexed signal includes a set of user-specific signature sequences and a common channelization code, and the joint detector is a minimum mean squares estimator (MMSE) detector, said joint detector comprising:

means for despreading and combining the received code-multiplexed signal to produce a plurality of combined signal components;

means for generating decision statistics from the plurality of combined signal components for detecting each of the plurality of OVSF code sharing control signals;

means for reducing cross-interference between the OVSF code sharing control signals based on both code information and time-varying channel information, said means for reducing cross-interference including a processing matrix that includes:
an element, C, which is a function of the set of user-specific signature sequences; and
an element, H, which is a function of the time-varying channel; and
means for estimating the symbol of interest from the OVSF code sharing control signals, each of said signals having reduced interference;
wherein the processing matrix in the MMSE detector also includes:
an element, A, which is a diagonal matrix having $$\sqrt{E_s(k)}$$

as a kth diagonal element, wherein $E_s(k)$ represents symbol energy for a kth control signal; and
an element σ, which is an estimate of noise variance.

2. The joint detector of claim 1, wherein the MMSE detector for a jth user, u(j), is of the form:

$$u(j) = \left((C^H HC + \sigma^2 A^{-2})^{-1} C^H\right)_j z,$$

where:
H is a diagonal matrix with a jth diagonal element equal to $|h(j)|^2$;
C is a matrix with the jth column equal to a jth signature sequence;
the subscript $_j$ represents a jth row of a matrix; and
z is a vector representing the plurality of combined signal components.

3. In a spread spectrum communications system, a method of jointly detecting a symbol of interest in a received signal utilizing a jointly hypothesized detector, said method recovering a symbol of interest transmitted on a time-varying channel in a communications medium according to a first signature spreading sequence of a set of signature spreading sequences utilized to transmit symbols in the system, the method comprising the steps of:
a) receiving a communications signal from the communications medium;
b) RAKE processing the received communications signal to resolve the signal into a plurality of combined signal components, a respective one of which is associated with the symbol of interest;
c) determining a set of symbols having the strongest energy;
d) determining a hypothesized received signal for the symbol of interest and the set of symbols that are determined to have the strongest energy, said hypothesized received signal being different from the received communication signal;
e) calculating an error metric based on the difference between the hypothesized received signal and the received communication signal, said error metric being determined by the signature sequences and the time-varying channel;
f) determining whether error metrics have been calculated for all hypothesized received signals;
g) upon determining that error metrics have not been calculated for all hypothesized received signals, repeating steps d) through f) until it is determined that error metrics have been calculated for all hypothesized received signals; and
h) upon determining that error metrics have been calculated for all hypothesized received signals, selecting the hypothesized received signal with the smallest error metric as being the detected symbols, one of which is associated with the symbol of interest.

4. The method of claim 3, wherein the hypothesized received signal is determined based on the hypothesized symbol values, time-varying channel, the estimated received amplitudes, and signature spreading sequences associated with the hypothesized symbols.

5. The method of claim 3, wherein step e) includes calculating the error metric, $M(\hat{s})$, utilizing the equation:

$$M(\hat{s}) = |z(\hat{s}) - z|^2,$$

where:
$z(\hat{s})$ is the hypothesized received signal; and
z is the received communication signal.

* * * * *

UNITED STATES PATENT AND TRADEMARK OFFICE
CERTIFICATE OF CORRECTION

PATENT NO. : 7,729,411 B2  Page 1 of 1
APPLICATION NO. : 11/115491
DATED : June 1, 2010
INVENTOR(S) : Wang et al.

It is certified that error appears in the above-identified patent and that said Letters Patent is hereby corrected as shown below:

In Column 4, Line 55, delete " $\sqrt{E_5(k)}$ " and insert -- $\sqrt{E_s(k)}$ --, therefor.

In Column 6, Line 64, in Equation (11), delete "P(s/z)." and insert -- P(s|z). --, therefor.

Signed and Sealed this

Third Day of August, 2010

David J. Kappos
*Director of the United States Patent and Trademark Office*